(12) United States Patent
Dmitri

(10) Patent No.: US 6,424,455 B1
(45) Date of Patent: Jul. 23, 2002

(54) WIDE BANDWIDTH FIBER RAMAN AMPLIFIER

(75) Inventor: Foursa Dmitri, Freehold, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/678,081

(22) Filed: Oct. 3, 2000

(51) Int. Cl.[7] .................................................. H01S 3/00
(52) U.S. Cl. ........................................................ 359/334
(58) Field of Search ............................... 359/334; 372/3

(56) References Cited

U.S. PATENT DOCUMENTS 5,321,707 A * 6/1994 Huber ............................ 372/6
6,052,219 A * 4/2000 Kidorf et al. ................ 359/334
6,292,288 B1 * 9/2001 Akasaka et al. ............ 359/334
6,320,884 B1 * 11/2001 Kerfoot, III et al. ............ 372/3

OTHER PUBLICATIONS

Liu et al., "Understanding the Formation of the SRS Stokes Spectrum in Fused Silica Fibers", IEEE Journal of Quantum Electronics, vol. 27, No. 4, Apr. 1991, pp. 1022–1030.*
Snitzer et al., Erbium–Doped Fiber Amplifiers Fundamentals and Technology, 1999, Academic Press, p. 55.*

* cited by examiner

Primary Examiner—Thomas H. Tarcza
Assistant Examiner—Deandra M. Hughes

(57) ABSTRACT

A method of Raman amplification comprising the step of effecting a plurality of pump wavelengths on a Raman-active transmission medium transmitting counter-propagating signal wavelengths, wherein at least one of said pump wavelengths are interleaved between said signal wavelengths.

19 Claims, 7 Drawing Sheets

WIDE BANDWIDTH FIBER RAMAN AMPLIFIER

FIELD OF THE INVENTION

This invention pertains to Raman amplifiers and, more particularly, to Raman amplifiers having a bandwidth which exceeds the peak Raman Stokes gain shift of the transmission medium with which the Raman amplifier is utilized.

BACKGROUND OF THE INVENTION

Optical fiber technology is currently utilized in communications systems to transfer information, e.g., voice signals and data signals, over long distances as optical signals. Over such long distances, however, the strength and quality of a transmitted optical signal diminishes. Accordingly, techniques have been developed to regenerate or amplify optical signals as they propagate along an optical fiber.

One well-known amplifying technique exploits an effect called Raman scattering to amplify an incoming information-bearing optical signal (referred to herein as a "signal wavelength"). Raman scattering describes the interaction of light with molecular vibrations of the material through which the light propagates (referred to herein as the "transmission medium"). Incident light scattered by molecules experiences a downshift in frequency from the power-bearing optical signal (referred to herein as the "pump wavelength"). This downshift in frequency (or increase in wavelength) from the pump wavelength is referred to as the "Stokes Shift." The downshift of the peak gain from the pump wavelength is referred to herein as the "peak Stokes shift." The extent of the downshift and the shape of the Raman gain curve is determined by the molecular-vibrational frequency modes of the transmission medium. In amorphous materials, such as silica, molecular-vibrational frequencies spread into bands which overlap and provide a broad bandwidth gain curve. For example, in silica fibers, the gain curve extends over a bandwidth of about 300 nm from the pump wavelength and has a peak Stokes shift of about 100 nm.

The overall concept of Raman scattering is well known and is described in numerous patents and publications, for example, R. M. Stolen, E. P. Ippen, and A. R. Tynes, "Raman Oscillation in Glass Optical Waveguides," Appl. Phys. Lett, 1972 v. 20, 2 PP62–64; and R. M. Stolen, E. P. Ippen, "Raman Gain in Glass Optical Waveguides," Appl. Phys. Lett, 1973 v. 23, 6 pp. 276–278), both of which are incorporated herein by reference. With respect to the present invention, the most relevant aspect of Raman scattering is its effect on signal wavelengths traveling along the transmission medium.

FIG. 1 illustrates prior art optical amplifier which utilizes Raman scattering to amplify a signal wavelength. Referring to FIG. 1, a pump wavelength ωp and a signal wavelength ωs are co-injected in opposite directions into a Raman-active transmission medium 10 (e.g., fused silicon). Co-propagating pumps may be used, although a counter-propagation pump scheme reduces polarization sensitivity and cross talk between wavelength division multiplexed (WDM) channels. Providing the wavelength of the signal wavelength ωs is within the Raman gain of power wavelength ωp (e.g., about 300 nm in silica), the signal wavelength ωs will experience optical gain generated by, and at the expense of, the pump wavelength ωp. In other words, the pump wavelength ωp amplifies the signal wavelength ωs and, in so doing, it is diminished in strength. This gain process is called stimulated Raman scattering (SRS) and is a well-known technique for amplifying an optical signal. The two wavelengths ωp and ωs are referred to as being "SRS coupled" to each other. A filter 16 transmits all signals of the signal wavelength ωs and blocks signals of the pump wavelength ωp thereby filtering out the pump wavelength.

FIG. 1A illustrates the gain curve for a signal wavelength ωs amplified using a single pump wavelength ωp. As shown in FIG. 1A, while gain occurs over a broad bandwidth (e.g. 300 nm in silica), only a portion of it (e.g., about 50 nm) is, from a practical standpoint, useable to effectively amplify the signal wavelength ωs. This useable bandwidth is referred to herein as the "effective Raman gain." The effective Raman gain is determinable by one skilled in the art and depends on a number of factors including the desired degree of amplification and the desired flatness across the amplification bandwidth. In silica, the effective Raman gain having less than 3 dB gain variation extends about 25 nm on either side of the peak Raman Stokes shift of about 100 nm. Therefore, the bandwidth of the effective Raman gain occurs from about 75 to about 125 nm from the pump wavelength as shown between points A and B on the Raman gain curve in FIG. 1A.

FIG. 2 is a schematic drawing illustrating the relationship between pump wavelengths and the signal wavelengths of a prior art Raman amplifier. The schematic of FIG. 2 shows multiple pump wavelengths ωp through ωp+n which are used to amplify signal wavelengths ωs through ωs+m. Because the effective Raman gain occurs about 75 to about 125 nm from the pump signal, signal wavelengths separated from a pump wavelength within this range will be effectively SRS coupled to the pump wavelength. In FIG. 2, pump wavelength ωp (1370 nm) is separated from signal wavelength ωs (1470 nm) by approximately 100 nm. Thus, assuming that the transmission medium 10 of FIG. 1 is silica, pump wavelength ωp will be SRS coupled to and amplify signal wavelength ωs.

If only a single pump wavelength ωp is used, only signals in the bandwidth from ωs−25 nm to ωs+25 nm would be within the effective Raman gain. However, the use of multiple pump wavelengths ωp through ωp+n as shown in FIG. 2 allows the gain bandwidth to be expanded to amplify signal wavelengths ωs through ωs+m. Furthermore, the use of multiple pump wavelengths serves to reduce gain variation (improve flatness) within this bandwidth due to the cumulative effect of multiple gain curves.

Despite multiple pump configurations, prior art Raman amplifiers are nevertheless limited in bandwidth, which in turn limits the capacity of WDM systems. More specifically, because the effective Raman gain tails off at about 125 nm from the pump wavelength, signal wavelengths beyond this point are not effectively amplified. Furthermore, the applicants have found that in multi-pump systems, where excellent flatness in amplification is achievable through the cumulative effect of multiple gain curves, signal wavelengths preferably should be within the peak Stokes shift of a pump wavelength, e.g., about 100 nm, for optimum flatness. This limitation in SRS coupling limits the bandwidth of signals, e.g. ωs from ωs+m as shown in FIG. 2, to the peak Stokes shift of a pump wavelength since extending the signal bandwidth beyond ωs+m would require introducing pump wavelengths into the signal bandwidth, beyond ωs.

Injecting pump wavelengths into the signal bandwidth, however, has traditionally been avoided due to backward Rayleigh scattering (BRS) resulting from the pump signals. BRS results from random localized variations of the molecular positions in glass that create random inhomogeneities of the reflective index that act as tiny scatter centers. Although the pump and signal wavelengths can be easily separated by filtering in a counter-propagating scheme, the BRS from the pump wavelengths, which propagates in the direction of the signals, is not easily filtered. Furthermore, BRS from longer pump wavelengths falls into the Raman gain generated by shorter pump wavelengths, thereby causing this BRS to be amplified such that it equals or exceeds the intensity of the signal wavelengths. For example, a pump wavelength generated at point A and intended to amplify a signal wavelength at point B would coincide with signal wavelength $\omega s+2$. The BRS from the pump wavelength at point A is affected by the Raman gain of the lower pump wavelengths, thus introducing undesired noise into the signal wavelengths near point A (FIG. 2). Thus, BRS both decreases the Raman amplification of the adjacent signals by depleting the pump wavelengths' power, and diminishes signal quality by introducing noise and cross-talk between the channels.

BRS also causes a four-wave-mixing effect. Four-wave-mixing is defined by third order susceptibility in the relation between the induced polarization from the electric dipoles and electric field. In a particular case of four-wave-mixing in optical fibers, a strong pump wave at a frequency $\omega_1$ creates two side bands located symmetrically at the frequencies $\omega_2$ and $\omega_3$. The frequency shift of the side bands is given by $\Omega_s = \omega_1 - \omega_2 = \omega_3 - \omega_1$, where $\omega_2 < \omega_3$. The phase matching requirement for this process is $k_2 - k_3 - 2k_1 = 0$, where k is the wave number. The two side bands may also introduce undesired noise into the signal wavelengths.

Accordingly, it would be desirable to have a method and apparatus for expanding the gain bandwidth of a Raman amplifier beyond the maximum gain Raman Stokes Shift of the transmission medium without the attendant problems of BRS.

SUMMARY OF THE INVENTION

In accordance with the present invention, the amplification bandwidth of a Raman amplifier is expanded by interleaving narrow pump wavelengths between signal wavelengths, thereby avoiding interaction between the signal wavelengths and the BRS of the interleaved pump wavelengths. The line width of the pump signals are narrow enough (e.g., less than 1 GHz) compared to the wavelength spacing of the signal wavelengths (e.g., as low as 25 GHz) so that the BRS of the interleaved pump wavelengths is readily distinguishable from signal wavelengths and can be efficiently filtered out.

One aspect of the present invention is a method of Raman amplification employing interleaved pump and signal wavelengths. In a preferred embodiment, the method comprises effecting a plurality of pump wavelengths on a Raman-active transmission medium which is transmitting counter-propagating signal wavelengths, wherein one or more of the pump wavelengths are interleaved between the signal wavelengths. Preferably, the plurality of pump wavelengths spans a bandwidth that exceeds the peak Raman Stokes Shift of the transmission medium. In a preferred embodiment, the method further comprises the step of reducing BRS generated from the interleaved pump wavelengths.

Another aspect of the present invention is a Raman amplification system for amplifying signal wavelengths propagating on a transmission medium by interleaving signal and pump wavelengths. In a preferred embodiment, the system comprises: (a) a pump for generating a plurality of pump wavelengths wherein at least one of the pump wavelengths is between two of the signal wavelengths; and (b) a coupler for coupling the pump wavelengths to the transmission medium such that the pump wavelengths and the signal wavelengths are counter-propagating. Preferably, the pump is adapted to generate pump wavelengths over a bandwidth greater than that of the peak Raman Stokes Shift.

Yet another aspect of the present invention is a long-haul cable system employing the amplification system as described above. In a preferred embodiment, the cable system comprises: (a) a transmission path; (b) a signal transmitter coupled to the transmission path and adapted for transmitting signal wavelengths; (c) a signal receiver coupled to the transmission path and adapted for receiving the signal wavelengths; and (d) at least one amplifier system as described above disposed along the transmission path between the signal transmitter and the signal receiver.

DETAILED DESCRIPTION OF THE PREFERRED EMBODIMENT

Figure 3:
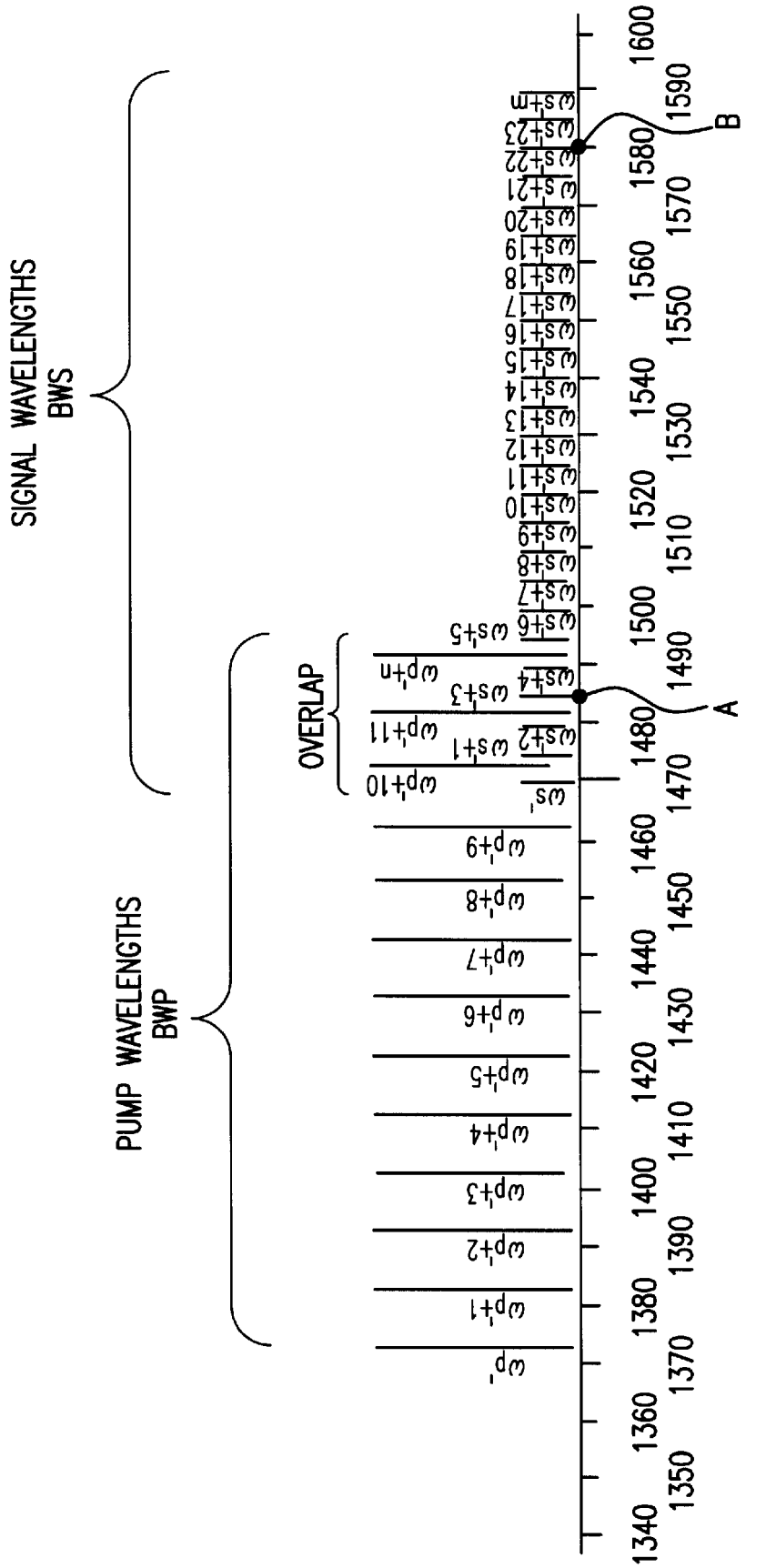
FIG. 3 is a schematic drawing illustrating the relationship between the pump wavelengths and the signal wavelengths of a Raman amplifier using the method and apparatus of the present invention.

FIG. 3 is a schematic drawing illustrating the relationship between the pump wavelengths and signal wavelengths of a Raman amplifier using the method and apparatus of the present invention. Referring to FIG. 3, a band of pump wavelengths $\omega p^1$ through $\omega p^1+n$ are shown. The bandwidth BWP of the pump wavelengths $\omega p^1$ through $\omega p^1+n$ exceeds one maximum gain Raman shift of the transmission medium. Preferably, the bandwidth of the pump wavelengths exceeds about 10% of the peak Stokes Shift, and more preferable, exceeds about 20% of the peak Stokes Shift. In the example of FIG. 3, the bandwidth BWP of the pump wavelengths $\omega p^1$ through $\omega p^1+n$ is 120 nm which exceeds one Raman maximum gain shift of silica by approximately 20 nm.

As can be seen in FIG. 3, the pump wavelengths $\omega p^1+10$, $\omega p^1+11$, $\omega p^1+n$ which overlap the signal wavelengths $\omega s^1$, $\omega s^1+1$, $\omega s^1+2$, $\omega s^1+3$, $\omega s^1+4$, and $\omega s^1+5$ are situated between the signal wavelengths. The line width of the pump wavelengths is narrow enough compared to the wavelength spacing of the signal wavelengths that the BRS generated from the pump wavelengths can be identified as such and efficiently filtered out. The minimum wavelength separation between the signal wavelengths, referred to herein as the "stop bandwidth" or the "100% rejection band of the filter," is related to the repetition rate, modulation format, signal strength, and transmission distance of the signal wavelength. For example, for a 10 Gb/s repetition rate, the separation between signal wavelengths may be no less than 0.2 nm (25 GHz at 1550 nm). A wider channel spacing is typically used in conventional transmission systems. A pump signal is preferably no wider than about 1/50 of the channel separation, and, more preferably, no wider than about 1/100 of the channel separation. Furthermore, the pump wavelength is positioned between signal wavelengths such that it appears in the middle between the adjacent signals. The accuracy to which a distributed feedback (DFB) laser can be tuned to a particular wavelength can be better than 0.01 nm (approximately 1.3 GHz).

Figure 3A:
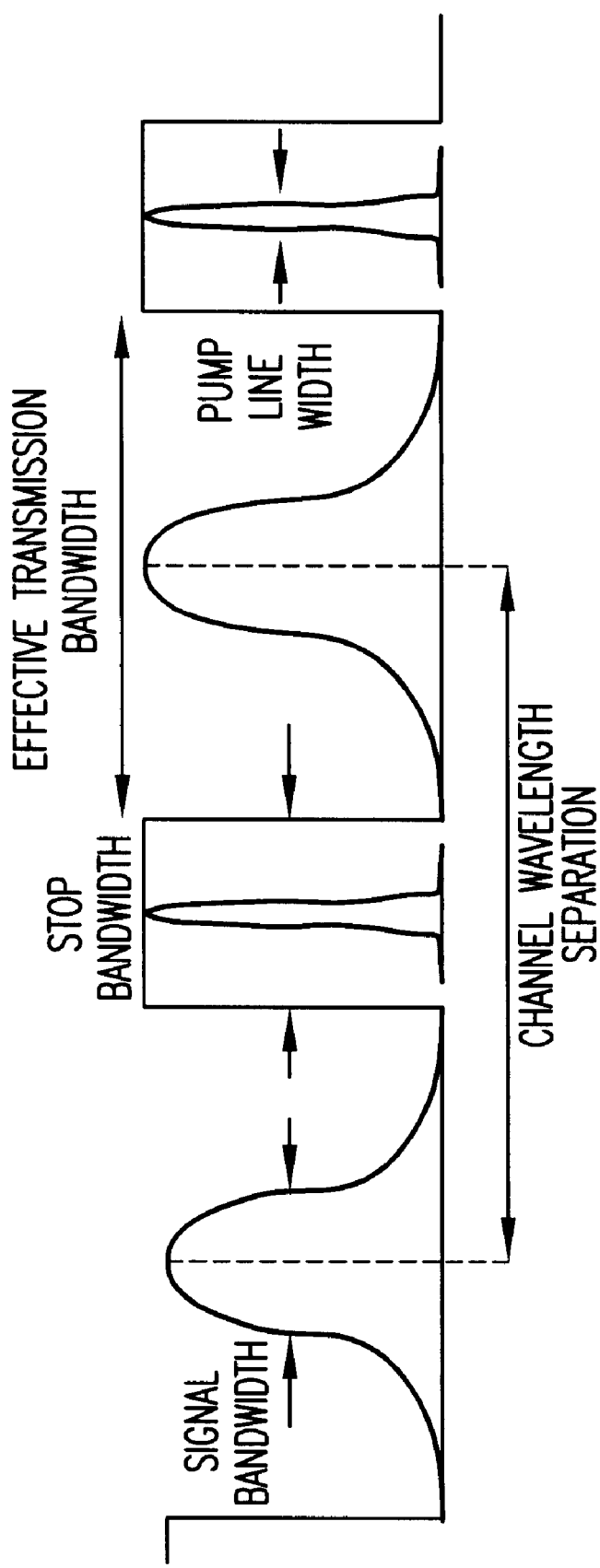
FIG. 3A is a simplified schematic drawing illustrating the relationship between the pump wavelengths and the signal wavelengths of a Raman amplifier using the method and apparatus of the present invention.

FIG. 3A illustrates, in a simplified manner, the relationship between the pump wavelengths and signal wavelengths of a Raman amplifier using the method and apparatus of the present invention. As can be seen in FIG. 3A, the stop bandwidth is the area between the effective transmission bandwidth of the signal bandwidth, and within the stop bandwidth, a significantly narrower pump linewidth is effected. As described herein, this allows effective filtering of any BRS generated from the pump wavelengths.

Figure 4:
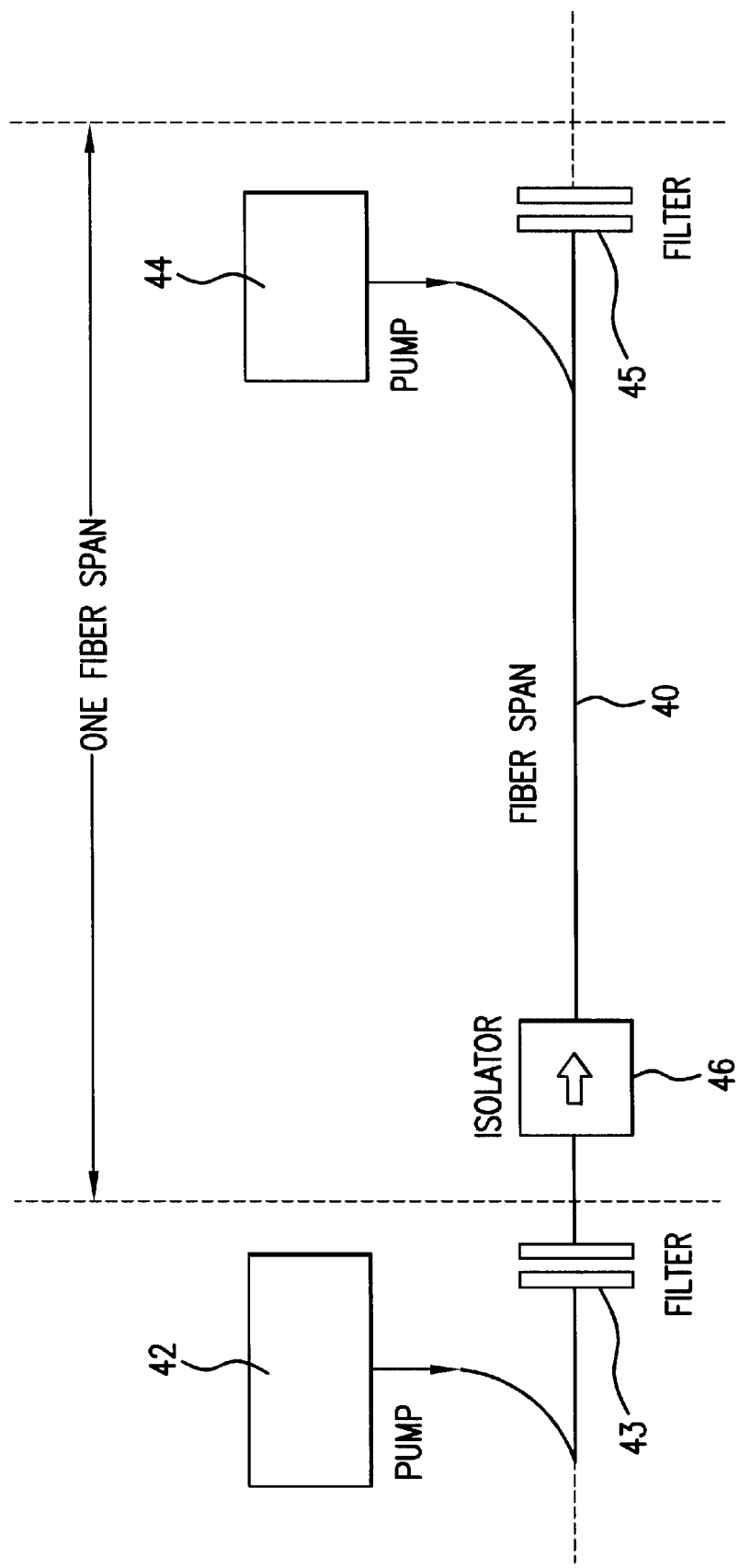
FIG. 4 is a block diagram of a Raman amplifier in accordance with the present invention.

FIG. 4 illustrates an exemplary embodiment of a Raman amplifier system in accordance with the present invention. As shown in FIG. 4, pump source 44 injects pump wavelengths onto a fiber span 40. In a preferred embodiment, pump source 44 comprises a DFB laser, which can provide wavelength stability of better than 0.01 nm. Wavelength stability depends partially on the filter characteristic, that is, the breadth of the 100% rejection band. It is in this area that, in accordance with the present invention, the narrow pump wavelengths are effected. In an ideal step-like (i.e., rectangular shape) filter, this will require a stability of better than ¼ of the filter stop bandwidth with the line width of the pump being less than 1/10 of the filter stop bandwidth. This bandwidth should be as narrow as possible so as not to decrease the effective channel transmission bandwidth. At the same time, it should be broad enough to allow for a given pump wavelength to be filtered out with maximum efficiency. Assuming the bandwidth and the wavelength stability of a pump equal to 1 GHz, the estimate for the filter stop bandwidth will be 4 GHz. It is desirable in practice to utilize an even smaller bandwidth, especially for a channel separation of less than 0.5 nm. The requirements when amplifying nonmodulated signals are broader because the line width of a CW signal is more than three orders of magnitude narrower than the bandwidth of a modulated RZ format signal at 10 Ghz.

DFB lasers emit wavelengths having line widths of less than 100 MHz and can deliver up to 20–30 mW of average power at the wavelength region of 1550 nm. These power levels are sufficient for amplification of the signal wavelengths when a pump scheme is used employing numerous, closely-packed pump wavelengths (e.g., when pump wavelength separation is less than 4 nm). As the wavelength separation between pumps increases, so must the power per pump wavelength. Pump power will also depend on signal power and the separation of the signals. The higher the required signal power and the smaller the separation between signal channels, the more pump power will be needed.

Filter 45 is tuned to transmit only signal wavelengths and not pump wavelengths. Suitable filters include, for example, Fabry-Perot filters and Mach-Zehnder wavelength multiplexers. Ideally, the transmission characteristics of the filter 45 are such that it permits maximum transmittance at the signal wavelengths and minimum transmittance at the pump wavelengths. Thus, the filter will pass the signal wavelengths and filter any signals occurring between the signal wavelengths, including BRS of the pump signals preferably in the 20 nm or more overlap area.

Isolator 46 provides unidirectional propagation and eliminates any multipath Rayleigh scattering effect and any reflection of the counter-proprogating radiation from the filter.

Pump source 42 and filter 43 are illustrative of a portion of another fiber span.

EXAMPLE

Figure 5:
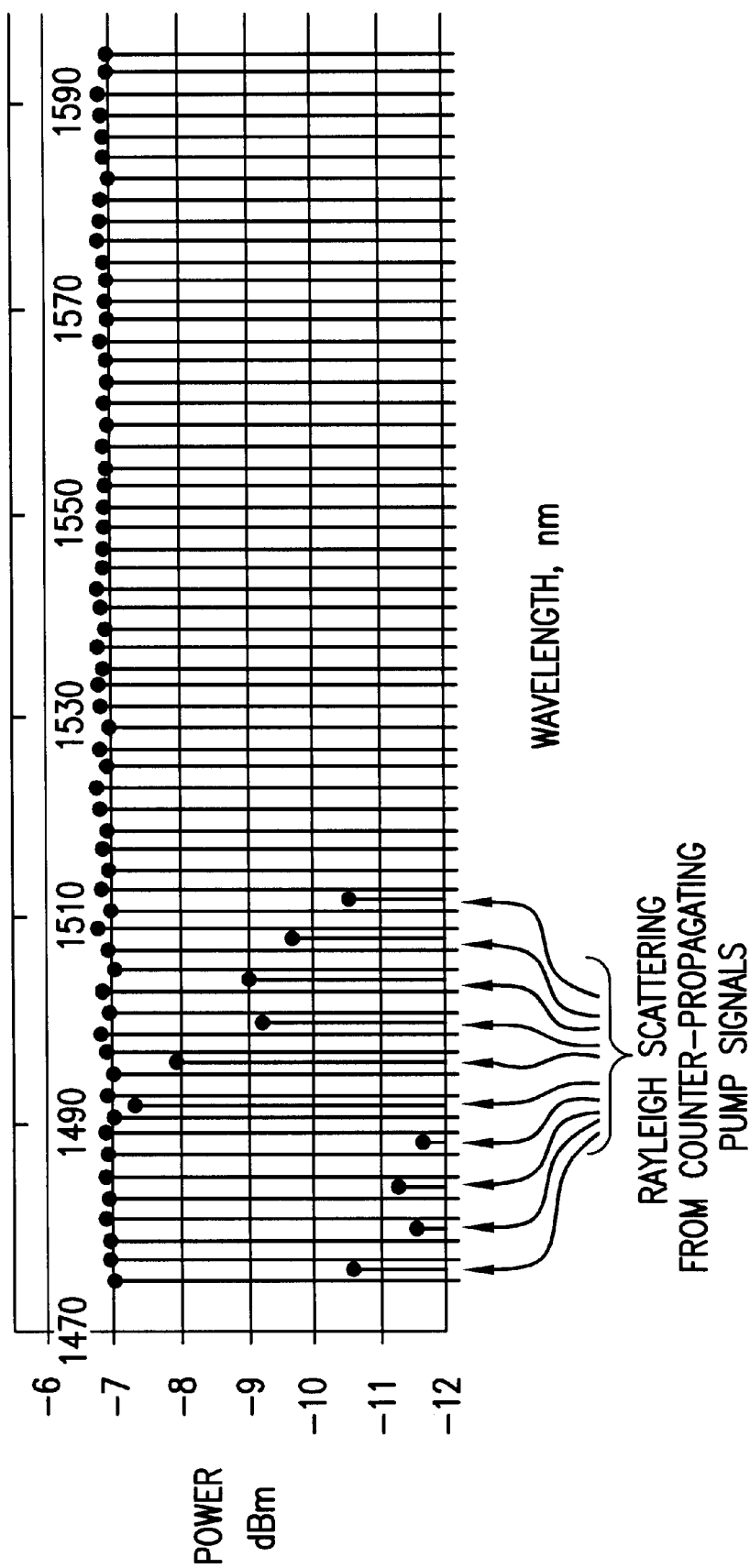
FIG. 5 is a graph showing the gain ripple of the output of a Raman amplifier in accordance with the present invention.

FIG. 5 illustrates the results of a numerical simulation of a Raman amplifier having 120 nm bandwidths. As shown, a gain ripple of less than 0.3 dB is achieved with 38 pump wavelengths (only 10 pump wavelengths are interleaved with signal wavelengths) situated at 4 nm spacing, illustrated by the relatively stable amplitude of the amplified signals at approximately −7 dBm. This numerical simulation is performed for 61 channel signals separated by 2 nm widths, thereby providing −7 dBm (0.2 mW) power per channel. The fiber span is represented as being 50 km long and consisting of standard telecommunication fiber with losses of 0.2 dB/km at 1550 nm. The total span loss at 1550 nm is 10 dB. Pump wavelengths start from 1360 nm (not shown) and end at 1512 nm. Signals start from 1475 nm and end at 1595 nm, covering three telecommunication bands (S, C, and L). The pump power starts at approximately 130 mW per pump and drops to below 10 mW above 1430 nm. Total pump power in the simulation is 1185 mW. This means that for the majority of pump wavelengths there will be no limitation on line width and precise positioning. These limitations will only apply for the wavelength region where the pump and signal bandwidths intersect (10 pumps for the simulation under discussion). In practice the number of pump wavelengths which coincide with signal bandwidths can be reduced. Utilization of fibers with smaller cross sections will reduce the required pump power.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method of Raman amplification comprising:
    effecting a plurality of pump wavelengths on a Raman-active transmission medium transmitting counter-propagating signal wavelengths, wherein one or more of said pump wavelengths are interleaved between said signal wavelengths; and
        wherein the line width of each of said pump wavelengths is narrower than the wavelength spacing of said signal wavelengths; whereby the backward Rayleigh scattering (BRS) of said interleaved pump wavelengths is distinguishable from said signal wavelengths.

2. The method of claim 1, wherein the plurality of pump wavelengths span a bandwidth that exceeds the peak Raman Stokes Shift of said transmission medium.

3. The method of claim 2, wherein said transmission medium comprises silica and wherein said peak Raman Stokes shift is about 100 nm.

4. The method of claim 1, further comprising:
    reducing BRS generated from the interleaved pump wavelengths; and filtering out said BRS from between said signal wavelengths.

5. The method of claim 1, wherein said signal wavelengths are separated by a bandgap and each of the interleaved pump wavelengths is no wider than about $\frac{1}{10}$ of said bandgap.

6. The method of claim 5, wherein each of the interleaved pump wavelengths is no wider than about $\frac{1}{20}$ of said bandgap.

7. The method of claim 6, wherein each of the interleaved pump wavelengths is no closer than about $\frac{1}{2}$ of the channel wavelength separation minus the sum of the pump source wavelength and the pump line width.

8. The method of claim 7, further comprising:
    reducing BRS generated from the interleaved pump wavelengths; and
    filtering out said BRS from between said signal wavelengths.

9. A method of Raman amplification in which the gain bandwidth of an amplifier performing the amplification exceeds the Raman Stokes Shift of a transmission medium in which the amplifier is situated, comprising:
    effecting an information-bearing signal comprising a plurality of wavelengths on said transmission medium; and
    effecting a pump signal comprising a plurality of pump wavelengths onto said transmission medium, wherein the difference in wavelength between at least two of said pump wavelengths exceeds the peak Raman gain of said transmission medium and wherein any of the pump wavelengths that overlap said information-bearing signal are interleaved with said signal wavelengths; and
        wherein the line width of each of said pump wavelengths is narrower than the wavelength spacing of said signal wavelengths; whereby the BRS of said interleaved pump wavelengths is distinguishable from said signal wavelengths.

10. A method of Raman amplification as set forth in claim 4, wherein said transmission medium comprises silica and wherein the spectral shape of said pump wavelengths and said signal wavelengths are Gaussian and have line widths no greater than about $\frac{1}{50}$th of the signal separation between adjacent signal wavelengths.

11. A Raman amplification system for amplifying signal wavelengths propagating on a transmission medium, said system comprising:
    a pump for generating a plurality of pump wavelengths wherein at least one of said pump wavelengths is between two adjacent signal wavelengths;
    a coupler for coupling said pump wavelengths to said transmission medium such that said pump wavelengths and said signal wavelengths are counter-propagating; and
        wherein the line width of each of said pump wavelengths is narrower than the wavelength spacing of said signal wavelengths; whereby the BRS of said interleaved pump wavelengths is distinguishable from said signal wavelengths.

12. The Raman amplification system of claim 11, wherein said pump is adapted to generate pump wavelengths covering a bandwidth greater than that of the peak Raman Stokes shift.

13. The Raman amplification system of claim 11, wherein said pump is adapted to generate wavelengths that are no wider than about $\frac{1}{10}$ of the bandgap between adjacent signal wavelengths.

14. The Raman amplification system of claim 13, wherein said pump is adapted to generate wavelengths that are no wider than about $\frac{1}{20}$ of said bandgap.

15. The Raman amplification system of claim 14, wherein said pump is a distributed feedback laser.

16. The Raman amplification system of claim 11, further comprising:
    a filter optically coupled to said transmission medium and tuned to block transmission of said pump wavelengths while transmitting said signal wavelengths.

17. The Raman amplification system of claim 11, further comprising:
    a filter optically connected to said transmission medium for reducing the BRS of pump wavelengths interleaved with said signal wavelengths.

18. The Raman amplification system of claim 16, wherein said filter comprises a Fabry-Perot filter.

19. The Raman amplification system of claim 16, wherein said filter comprises a Mach-Zehnder wavelength multiplexer.

* * * * *

UNITED STATES PATENT AND TRADEMARK OFFICE
CERTIFICATE OF CORRECTION

PATENT NO. : 6,424,455 B1  
DATED : July 23, 2002  
INVENTOR(S) : Dmitri Foursa

Page 1 of 1

It is certified that error appears in the above-identified patent and that said Letters Patent is hereby corrected as shown below:

Title page,
Item [12], replace "Dmitri" with -- Foursa --; and
Item [75], replace "Foursa Dmitri" with -- Dmitri Foursa --.

Figure 1:
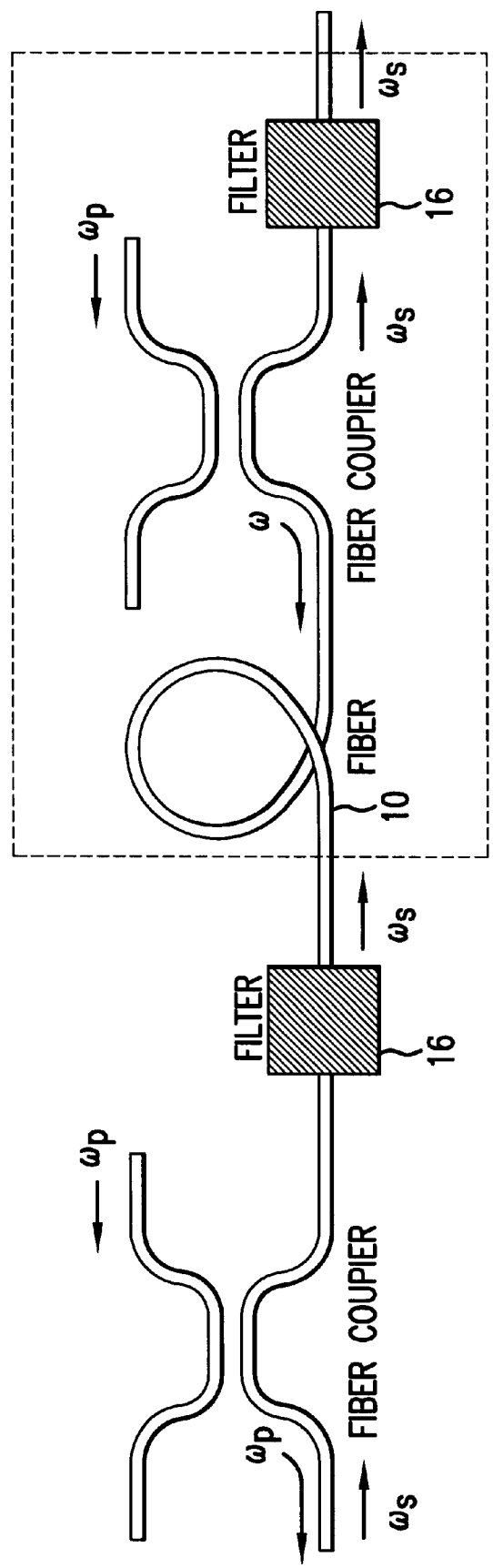
FIG. 1 is a block diagram of a prior art Raman amplifier.
Figure 1A:
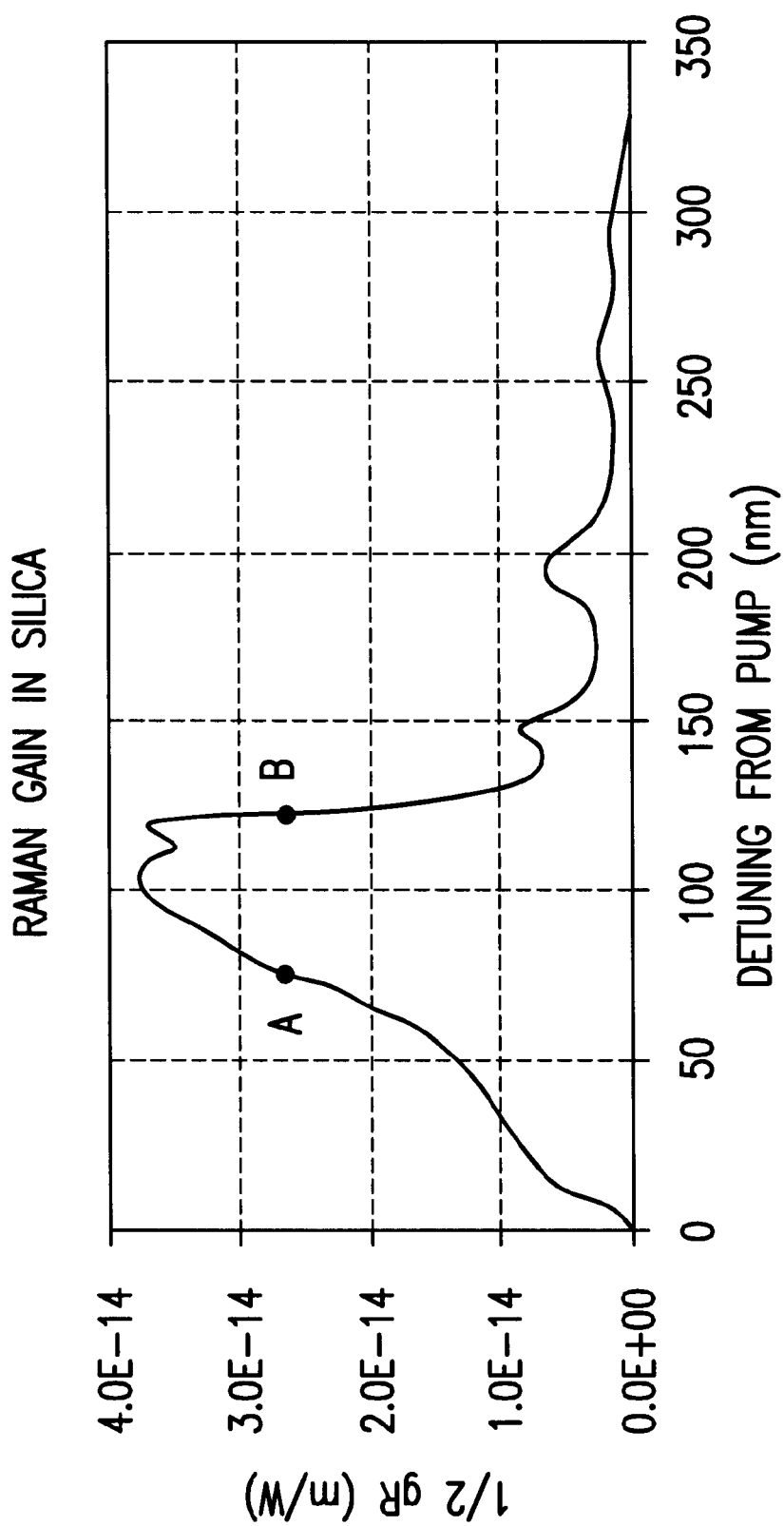
FIG. 1A illustrates the gain curve for a signal wavelength, amplified using a single pump wavelength in accordance with the prior art.
Figure 2:
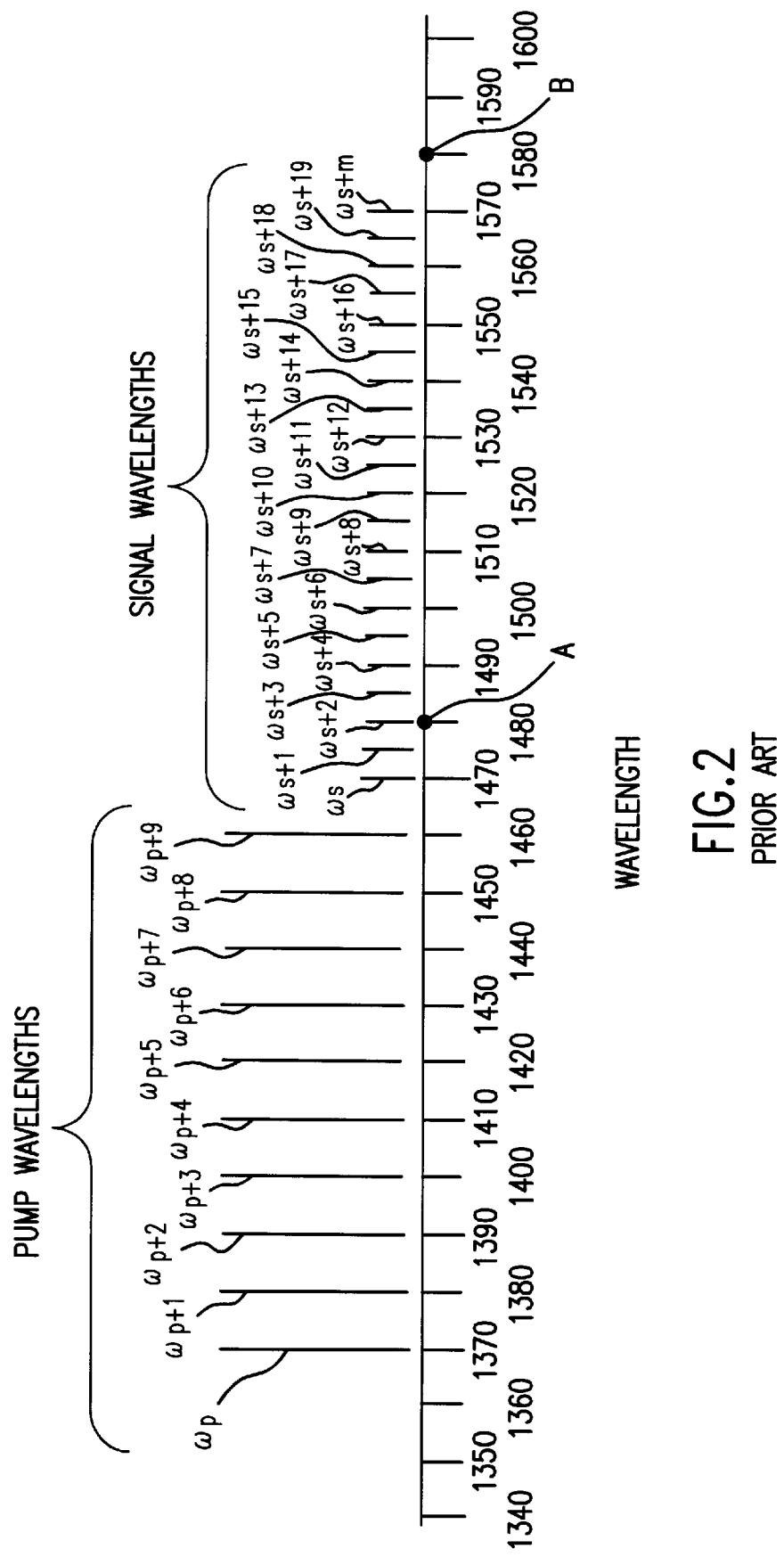
FIG. 2 is a schematic drawing illustrating the relationship between the pump wavelengths and the signal wavelengths of a prior art multiple-pump Raman amplifier.

Drawings,
Sheet 1, FIG. 1, replace the symbol "ω" with -- $\omega_P$ --; and
Sheet 1, FIG. 1, replace both occurrences of "COUPIER" with -- COUPLER --.

Column 2,
Line 26, replace "cop" with -- $\omega_P$ --; and
Line 28, replace "75to" with -- 75 to --.

Signed and Sealed this

Twenty-fifth Day of March, 2003

JAMES E. ROGAN  
*Director of the United States Patent and Trademark Office*